(12) United States Patent
Xu et al.

(10) Patent No.: US 11,727,269 B2
(45) Date of Patent: Aug. 15, 2023

(54) DUAL MODEL INCREMENTAL LEARNING

(71) Applicant: International Business Machines Corporation, Armonk, NY (US)

(72) Inventors: Jing Xu, Xian (CN); Si Er Han, Xian (CN); Ji Hui Yang, Beijing (CN); Xue Ying Zhang, Xian (CN); Rui Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 16/736,884

(22) Filed: Jan. 8, 2020

(65) Prior Publication Data

US 2021/0209463 A1 Jul. 8, 2021

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC .......... G06N 20/00; G06N 7/005; G06N 3/08; G06N 3/0454; G06N 3/0445; G06N 3/084; G06N 5/04; G06N 5/003; G06N 5/046; G06N 3/0481; G06N 5/022; G06N 3/02; G06N 3/088; G06N 3/0427; G06N 3/0436; G06N 3/0472; G06N 3/04; G06N 20/10; G06N 5/02; G06N 20/20; G06N 5/048; G06N 3/006; G06N 5/047; G06N 7/023; G06N 5/025; G06N 7/02; G06N 5/043; G06N 3/126

USPC .......................................................... 706/21
See application file for complete search history.

(56) References Cited

U.S. PATENT DOCUMENTS

| | | | |
|---|---|---|---|
| 6,513,025 | B1 | 1/2003 | Rosen |
| 2004/0003042 | A1* | 1/2004 | Horvitz ................ G06Q 10/109 709/204 |
| 2019/0156153 | A1* | 5/2019 | Can ......................... G06F 18/24 |
| 2019/0180147 | A1 | 6/2019 | Zhang |

(Continued)

FOREIGN PATENT DOCUMENTS

CN 107194414 A 9/2017

OTHER PUBLICATIONS

Jutten et al., "A new scheme for incremental learning", Neural Processing Letters, vol. 2, No. 1, 1-4, 1995, 4 pages.

(Continued)

*Primary Examiner* — Ajibola A Akinyemi
(74) *Attorney, Agent, or Firm* — Randy Tejeda (57) ABSTRACT

In an approach to efficient model adjustment utilizing a dual model system, one or more computer processors create a subset of a dataset utilizing a trained primary model; create a secondary model based on the created subset of the dataset; calculate a confidence of a case utilizing the trained primary model, wherein the confidence is a robustness indicator of a model indicating a capacity of the model to meet or exceed performance when applied to the dataset; responsive to the calculated confidence not exceeding a confidence threshold, generate a score of the case utilizing the created secondary model; responsive to an incorrect classification, update the created subset of the dataset with the case; retrain the secondary model utilizing the updated subset of the dataset.

20 Claims, 5 Drawing Sheets

(56) References Cited

U.S. PATENT DOCUMENTS

2020/0250766 A1* 8/2020 Sancheti ................ G06V 10/22
2021/0133497 A1* 5/2021 Faller ................... G06V 10/764

OTHER PUBLICATIONS

Wen et al., "A rapid learning algorithm for vehicle classification", Information Sciences, Elsevier, Received Jun. 27, 2014, © 2014 Elsevier Inc., 12 pages.

* cited by examiner

DUAL MODEL INCREMENTAL LEARNING

BACKGROUND

The present invention relates generally to the field of machine learning and more particularly to incremental learning.

Incremental learning is a method of machine learning in which input data is continuously used to extend knowledge of an existing model (i.e., to further train the model). Incremental learning represents a dynamic technique of supervised learning and unsupervised learning that can be applied when training data becomes available gradually over time or its size is out of system memory limits. Algorithms that can facilitate incremental learning are known as incremental machine learning algorithms. Many traditional machine learning algorithms inherently support incremental learning. Other algorithms can be adapted to facilitate incremental learning. Examples of incremental algorithms include decision trees, decision rules, artificial neural networks, and incremental SVM. The aim of incremental learning is for the learning model to adapt to new data without forgetting its existing knowledge, it does not retrain the model. Some incremental learners have built-in some parameter or assumption that controls the relevancy of old data, while others, called stable incremental machine learning algorithms, learn representations of the training data that are not even partially forgotten over time. Incremental algorithms are frequently applied to data streams or big data, addressing issues in data availability and resource scarcity respectively. Stock trend prediction and user profiling are some examples of data streams where new data becomes continuously available. Applying incremental learning to big data aims to produce faster classification or forecasting times.

SUMMARY

Embodiments of the present invention disclose a computer-implemented method, a computer program product, and a system for efficient model adjustment utilizing a dual model system. The computer-implemented method includes one or more computer processors creating a subset of a dataset utilizing a trained primary model. The one or more computer processors create a secondary model based on the created subset of the dataset. The one or more computer processors calculate a confidence of a case utilizing the trained primary model, wherein the confidence is a robustness indicator of a model indicating a capacity of the model to meet or exceed performance when applied to the dataset. The one or more computer processors responsive to the calculated confidence not exceeding a confidence threshold, generate a score of the case utilizing the created secondary model. The one or more computer processors responsive to an incorrect classification, update the created subset of the dataset with the case. The one or more computer processors retrain the secondary model utilizing the updated subset of the dataset.

DETAILED DESCRIPTION

Robotics, system monitoring, and user-modeling in real time require adaptive systems that can capture the information from new coming data, change when necessary with their environments. Traditionally, batch learning is utilized when a whole training set is available at the beginning of the learning process. When new data is added to database, the existing model built on past data may or may not stay accurate. Incremental learning is a method of machine learning, in which input data is continuously used to extend the existing model's knowledge (i.e., to further train the model) Like batch learning, incremental learning aims at minimizing the generalization error but with a growing training set. Incremental learning is a two-step procedure that is applied at an arrival of new observations. A system initiates a complete relearning of all the parameters using the training data observed so far when a new example fails to be correctly classified and evaluates if the prediction for the new example is correct. Then, if the prediction for the new example is not correct, the system adds new parameters to be learnt with the whole network (for instance, a neuron is created, if the classifier is a neural network). A significant drawback for said incremental learning system is that the cost for a complete re-learning process is very large under a big data concept.

Embodiments of the present invention allow provide a fast, low cost model adjustment and adaptation system. Embodiments of the present invention train a primary model, detects, and collects cases that have low confidence, not necessarily wrongly classified. Embodiments of the present invention expand the low confidence cases using model information to form an auxiliary dataset. Embodiments of the present invention create a second model, referred to as the auxiliary model, based on the auxiliary data for fast adjustment. Embodiments of the present invention recognize that system efficiency is increased due to the utilization of the auxiliary data which is substantially smaller than the original training set. Embodiments of the present invention rebuild the primary model utilizing the entire data set only when a significant amount of low confidence cases are cumulated. Embodiments of the present invention utilizes a collaboration of dual models to generate better predictions when compared with a single predictive model. Embodiments of the present invention endow a more efficient framework for incremental learning. Embodiments of the present invention recognize that system efficiency is gained by reducing a size of a training dataset and corpus. Embodiments of the present invention recognize reducing a training corpus, reduces training time by subsequent models.

For example, reducing a training corpus by a third, reduces training time at least a third. Implementation of embodiments of the invention may take a variety of forms, and exemplary implementation details are discussed subsequently with reference to the Figures.

The present invention will now be described in detail with reference to the Figures.

Figure 1:
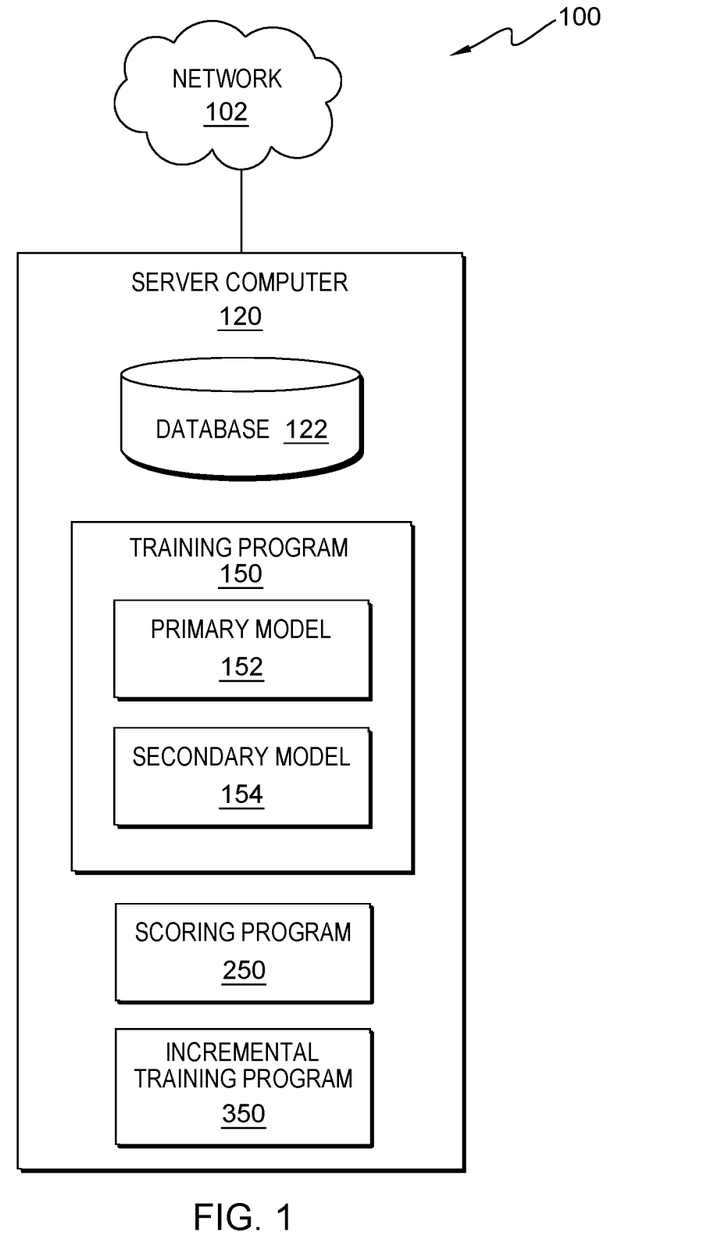
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and training program 150, scoring program 250, and incremental training program 350. In other embodiments, server computer 120 may contain other applications, databases, programs, etc. which have not been depicted in computational environment 100. Server computer 120 may include internal and external hardware components, as depicted and described in further detail with respect to FIG. 5.

Database 122 is a repository for data used by training program 150, scoring program 250, and incremental training program 350. In the depicted embodiment, database 122 resides on server computer 120. In another embodiment, database 122 may reside elsewhere within computational environment 100 provided training program 150, scoring program 250, and incremental training program 350 have access to database 122. A database is an organized collection of data. Database 122 can be implemented with any type of storage device capable of storing data and configuration files that can be accessed and utilized by training program 150, scoring program 250, and incremental training program 350, such as a database server, a hard disk drive, or a flash memory. In an embodiment, database 122 stores data used by training program 150, scoring program 250, and incremental training program 350, such as one or more examples, sets of training data, data structures, and/or variables used to fit the parameters of a specified model. The contained data may comprise of input vector pairs with associated output vectors. In an embodiment, database 122 may contain one or more sets of one or more instances of unclassified or classified (e.g., labelled) data, hereinafter referred to as training statements. In another embodiment, the training data contains an array of training statements organized in labelled training sets. For example, a plurality of training sets include "positive" and "negative" labels paired with associated training statements (e.g., words, sentences, etc.). In an embodiment, each training set includes a label and an associated array or set of training statements which can be utilized to train one or more models. In an embodiment, database 122 contains unprocessed training data. In an alternative embodiment, database 122 contains natural language processed (NLP) (e.g., section filtering, sentence splitting, sentence tokenizer, part of speech (POS) tagging, tf-idf, etc.) feature sets. In a further embodiment, database 122 contains vectorized (i.e., one-hot encoding, word embedded, dimension reduced, etc.) training sets, associated training statements, and labels. In an embodiment, database 122 contains a primary corpus (e.g., dataset), utilized to train a primary model and an auxiliary corpus (e.g., dataset) utilized to a train a secondary (e.g., subset of a dataset (e.g., primary dataset)) model.

Primary model 152 and secondary model 154 are representative of a plurality of models capable of utilizing incremental learning algorithms such as trees, decision rules, artificial neural networks, and incremental SVM. In the depicted embodiment, primary model 152 and secondary model are representative of a plurality of decision trees. Primary model 152 is created and trained with an entire corpus or a primary dataset. Secondary model 154 is created and trained with an auxiliary dataset based on a very limited number of auxiliary (e.g., short-term, "special cases", etc.) cases, allowing fast adjustment and inclusion a new case without a retraining of the primary model. The training of primary model 152 and secondary model 154 is depicted and described in further detail with respect to FIG. 2.

Training program 150, scoring program 250, and incremental training program 350 are programs for efficient model adjustment utilizing a dual model system. In various embodiments, training program 150, scoring program 250, and incremental training program 350 may implement the following steps: create a subset of a dataset utilizing a trained primary model; create a secondary model based on the created subset of the dataset; calculate a confidence of a case utilizing the trained primary model, wherein the confidence is a robustness indicator of a model indicating a capacity of the model to meet or exceed performance when applied to the dataset; responsive to the calculated confidence not exceeding a confidence threshold, generate a score of the case utilizing the created secondary model; responsive to an incorrect classification, update the created subset of the dataset with the case; retrain the secondary model utilizing the updated subset of the dataset. In the depicted embodiment, training program 150, scoring program 250, and incremental training program 350 are standalone software program. In another embodiment, the functionality of training program 150, scoring program 250, and incremental training program 350, or any combination programs thereof, may be integrated into a single software program. In some embodiments, training program 150, scoring program 250, and incremental training program 350 each may be located on separate computing devices (not depicted) but can still communicate over network 102. In various embodiments, client versions of training program 150, scoring program 250, and incremental training program 350 reside on any other computing device (not depicted) within computational environment 100. training program 150, scoring program 250, and incremental training program 350 are depicted and described in further detail with respect to FIG. 2, FIG. 3, and FIG. 4.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Training program 150, scoring program 250, and incremental training program 350 provide informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Training program 150, scoring program 250, and incremental training program 350 enable the authorized and secure processing of user information, such as tracking information, as well as personal data, such as personally identifying information or sensitive personal information. Training program 150, scoring program 250, and incremental training program 350 provide information regarding the personal data and the nature (e.g., type, scope, purpose, duration, etc.) of the processing. Training program 150, scoring program 250, and incremental training program 350 provide the user with copies of stored personal data. Training program 150, scoring program 250, and incremental training program 350 allow the correction or completion of incorrect or incomplete personal data. Training program 150, scoring program 250, and incremental training program 350 allow the immediate deletion of personal data.

Figure 2:
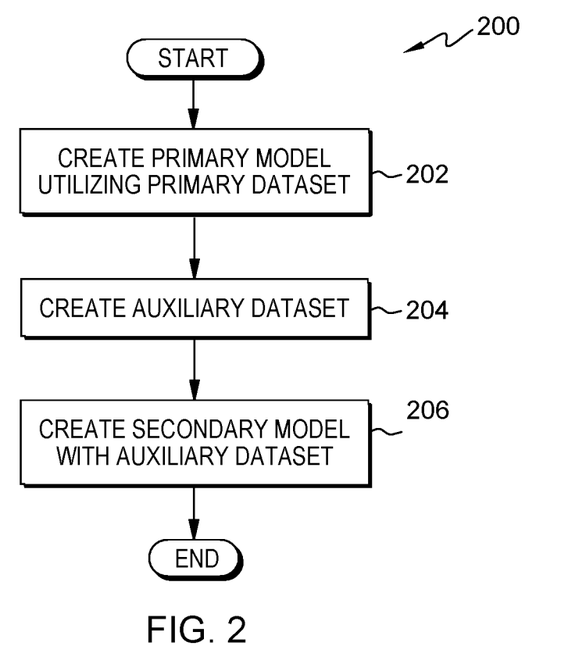
FIG. 2 is a flowchart depicting operational steps of a training program, on a server computer within the computational environment of FIG. 1, for training a plurality of models, in accordance with an embodiment of the present invention.

FIG. 2 is a flowchart depicting operational steps of a training program for training a plurality of models, in accordance with an embodiment of the present invention.

Training program 150 creates a primary model (step 202). In an embodiment, training program 150 creates, initializes, and trains primary model 152 utilizing an entire corpus or training set (e.g., primary dataset). In the depicted embodiment, primary model 152 is a random forest model trained with an entire corpus, dataset, and/or training set. In an alternative embodiment, primary model 152 can be any model or machine learning algorithm capable of incremental training principles and practices. In an embodiment, training program 150 initializes primary model 152 with randomly generated weights. In an alternative embodiment, training program 150 initializes primary model 152 with weights calculated from a preprocessing function such as tf-idf. In yet another embodiment, training program 150 performs supervised training with the labeled vectorized data. For example, training program 150 feeds input/output pairs into primary model 152, allowing training program 150 to make inferences between the problem data and the solution data (i.e., label). In an embodiment, training program 150 creates a plurality of auxiliary models (e.g., tertiary, quaternary, etc.), each trained with a dataset that is a subset of a larger training set and each associated with a distinct confidence threshold.

Primary model 152 produces two sets of outputs: a confidence threshold ($\delta$) based on one or more case predictions (e.g., test sets or historical cases) and a set of derived features (e.g., attributes, etc.) based on the one or more predictions. In the depicted embodiment, training program 150 utilizes out-of-bag (OOB) predictions to generate the confidence threshold. Training program 150 utilizes confidence as a robustness indicator of a model indicating the capacity of the model to meet or exceed the same performance when it is applied to a new data set containing same characteristics as the training dataset. In an embodiment, training program 150 computes the confidence threshold from a calculated cumulative probability distribution. For example, in order to collect 2.3% of the training data to form the auxiliary dataset, training program 150 utilizes a 66.7% confidence value as the confidence threshold utilizing a calculated probability distribution.

Training program 150 creates auxiliary dataset (step 204). In an embodiment, responsive to primary model 152 being fed with cases (e.g., inputs), primary model 152 generates a confidence value for each case. Training program 150, then, collects and stores identified low confidence cases (e.g., cases that do not exceed a confidence threshold (e.g., less than 50%, etc.)) into an auxiliary dataset, independent from the original training corpus. In an embodiment, "special cases" below a confidence threshold ($\delta$) are referred to as minor pattern cases. Said minor pattern cases are collected and expanded with outputted derived features to form an auxiliary dataset which is considerably smaller than the original training corpus.

Training program 150 creates secondary model with auxiliary dataset (step 206). Secondary model 154 is trained, solely, utilizing the created auxiliary dataset. In various embodiments, training program 150 creates and trains secondary model 154 utilizing the procedures, algorithms, and methods discussed in step 202. Training program 150 trains secondary model 154 with the created auxiliary dataset containing low confidence cases (e.g., training and test sets). Training secondary model 154 is substantially more resource and cost efficient when compared to the training of primary model 152 utilizing the entire corpus. In the depicted embodiment, secondary model 154 is a random forest model. In an alternative embodiment, secondary model 154 can be any model or machine learning algorithm capable of incremental training principles and methods.

Figure 3:
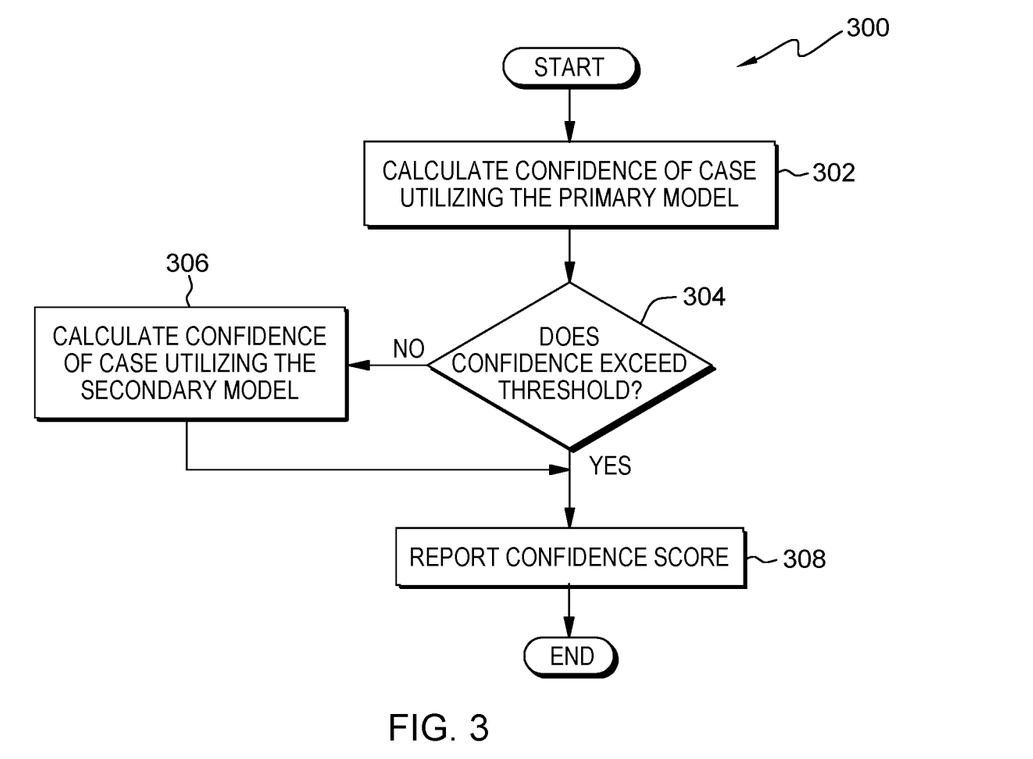
FIG. 3 is a flowchart depicting operational steps of a scoring program, on a server computer within the computational environment of FIG. 1, for scoring a plurality of models, in accordance with an embodiment of the present invention.

FIG. 3 is a flowchart depicting operational steps of a scoring program for scoring a plurality of models, in accordance with an embodiment of the present invention.

Scoring program 250 calculates a confidence value of a case utilizing the primary model (step 302). Scoring program 250 feeds a new case (e.g., input) into primary model 152 to obtain a confidence value for the new case. In the depicted embodiment, scoring program 250 inputs a new case into a random forest model (i.e., primary model 152), and generates an associated confidence value corresponding to the new case. In an embodiment, the new case is a new training example utilized to update a plurality of models based on an associated confidence value and threshold. In various embodiments, scoring program 250 stores the generated confidence value in database 122.

If the confidence exceeds a confidence threshold ("yes" branch, decision block 304), then training program 150 reports a score (step 308). Training program 150 reports the score generated from the primary model as described in step 308.

If the confidence does not exceed a confidence threshold ("no" branch, decision block 304), then scoring program 250 inputs the case into the secondary model (step 306). Scoring program 250 utilizes the confidence threshold described and generated in steps 202 and 204, outputted by primary model 152. In an embodiment, scoring program 250 determines which threshold (e.g., accuracy, reliability, storage, etc.) to utilize and adjusts the confidence threshold value (e.g., a 20% training set delta, etc.). In an embodiment, a user specifies the confidence threshold value. In other embodiment, the model, system, and/or production server requirements/purpose dictates the confidence threshold value. In the depicted embodiment, scoring program 250 inputs the case into another random forest (the secondary model 152 or auxiliary model).

Scoring program 250 reports a score (step 308). In various embodiments, scoring program 250 reports a score generated from the inputting of a new case into primary model 152 and/or secondary model 154. In decision block 304, if the calculated confidence value is higher than a confidence threshold then scoring program 250 reports the score (e.g., present the output, incorporate the score into a plurality of datasets and corpuses, trigger retraining of a plurality of models, pass score to next function (e.g., step, etc.) etc.) outputted by primary model 152. For example, scoring program 250 reports a score is generated by a primary random forest model that exceeded a confidence threshold. In decision block 304, if the calculated confidence value is lower than a confidence threshold then scoring program 250 reports the score outputted by secondary model 154. For example, scoring program 250 reports a score is generated by a secondary random forest model that did not exceed a confidence threshold. In various embodiments, scoring program 250 stores a score generated from a primary or secondary model in database 122. In an embodiment, scoring program 250 transmits one or more scores to incremental training program 350.

Figure 4:
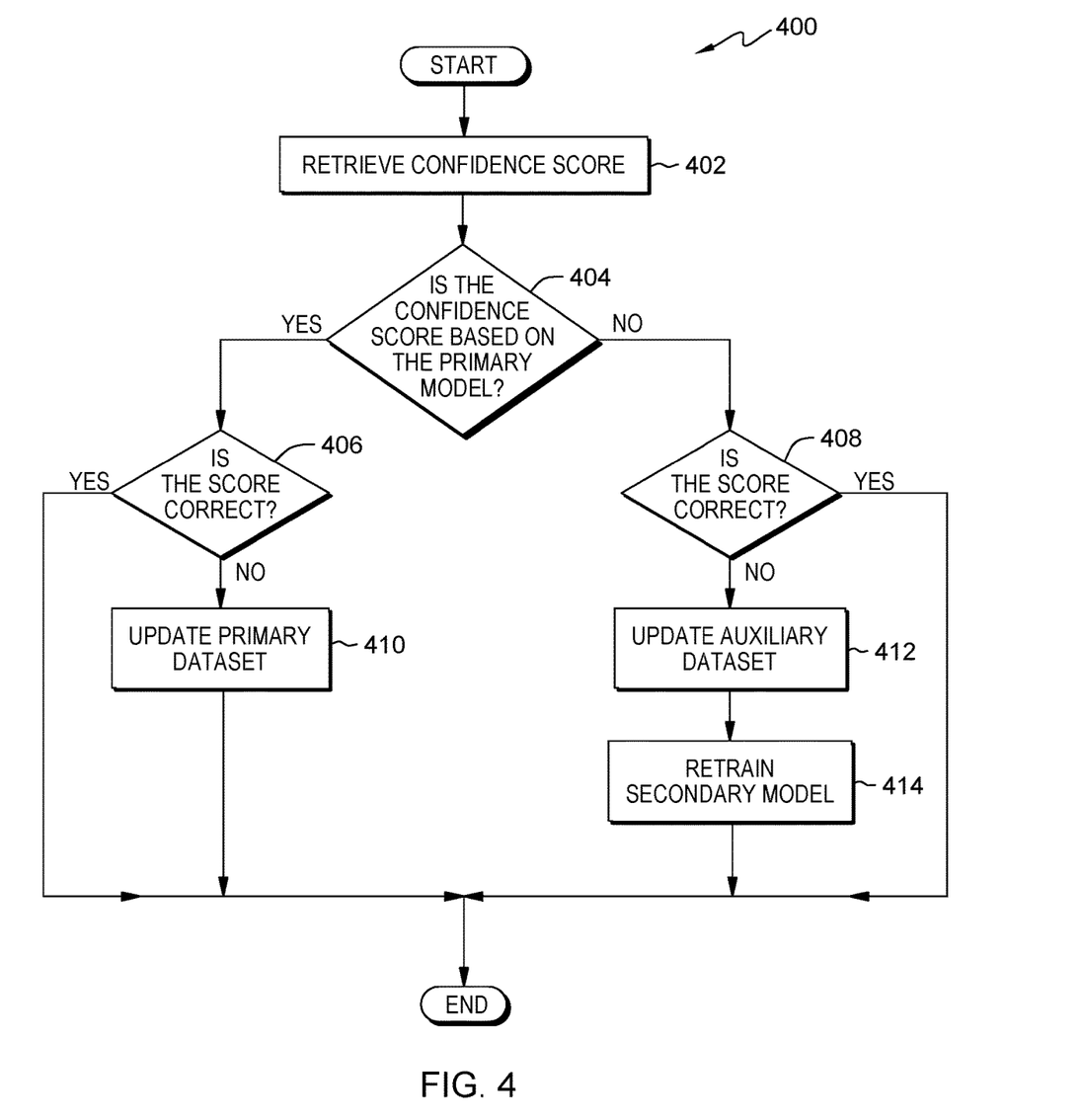
FIG. 4 is a flowchart depicting operational steps of an incremental training program, on a server computer within the computational environment of FIG. 1, for efficient model adjustment utilizing a multiple model system, in accordance with an embodiment of the present invention.

FIG. 4 is a flowchart depicting operational steps of an incremental training for efficient model adjustment utilizing a multiple model system, in accordance with an embodiment of the present invention.

Incremental training program 350 retrieves a confidence score (step 402). In an embodiment, incremental training program 350 retrieves one or more scores stored within database 122. In another embodiment, incremental training program 150 receives one or more scores from scoring program 250.

If the confidence score is based on the primary model ("yes" branch, decision block 404), then incremental training program 350 determines if the score is correct (decision block 406). If the score is incorrect ("no" branch, decision block 406), then incremental training program 350 updates the primary dataset (step 410). In an embodiment, incremental training program 350 compares a generated or calculated score and compares the score with an expected output. In this embodiment, the score is a confidence value, accuracy value, or a classification. In an embodiment, if the score is a confidence value and the value does not match (e.g., exceeding a threshold or not within a predetermined range of values) an expect output confidence then the score is determined as incorrect. In another embodiment, if the score is a classification and the classification is incorrect (e.g., a classification should be a dog but program 150 classifies a cat, etc.), then the score is determined as incorrect. Incremental training program 350 updates primary dataset (step 410). In an embodiment, where primary model 152 reported a score that is not correct (e.g., wrongly classified, etc.), then the corresponding case is labelled, considered, and/or a long-term training case. In this embodiment, long-term training cases are stored and/or logged into one or more training corpuses (e.g., database 122, primary corpus, primary dataset, etc.) and/or sets. In various embodiments, the retraining of primary model 152 is initiated by a plurality of triggers including, but not limited to, fixed training intervals, validation/testing thresholds, accuracy thresholds, and/or threshold controlling a number of stored (e.g., accumulation) long-term training cases. For example, incremental training program 350 initiates retraining of primary model 152 when long-term training cases comprises (e.g., accumulates) over 25% of training cases in a primary corpus.

If the confidence score is based on the secondary model ("no" branch, decision block 404), then incremental training program 350 determines if the score is correct (decision block 408). If the score is incorrect ("no" branch, decision block 408), then incremental training program 350 updates the auxiliary dataset (step 412). In an embodiment, incremental training program 350 compares a generated or calculated score and compares the score with an expected output. In this embodiment, the score is a confidence value, accuracy value, or a classification. In an embodiment, if the score is a confidence value and the value does not match an expect output confidence then the score is determined as incorrect. In another embodiment, if the score is a classification and the classification is incorrect, then the score is determined as incorrect.

Incremental training program 350 updates auxiliary dataset (step 412). In an embodiment, where secondary model 152 reported a score that is not correct (e.g., wrongly classified, etc.), then the corresponding case is labelled, considered, and/or a short-term training case. In a further embodiment, training program 150 adds said short-term training case into an auxiliary dataset and expands said dataset. Short-term training (e.g., secondary model 154, auxiliary model, etc.) is performed more frequently when compared to the long-term training (e.g., primary model 152). In an embodiment, short-term training updates only the auxiliary model (e.g., secondary model 154, the secondary random forest in the continuing example, etc.). Since secondary model 154 (e.g., auxiliary model) is built on very limited number of auxiliary cases, as well as the short-term training cases, updating said model requires a much lower computational cost when compared to updating a whole system (primary model 152 and secondary model 154).

Incremental training program 350 retrains secondary model (step 414). Incremental training program 350 logs relevant data into database 122 and retrains a plurality of models utilizing an adjusted corpus containing training and testing sets. In an embodiment, the retraining of secondary model 154 is triggered by an identification of a new short-term training case. Responsive to a retraining, training program 150 may deploy said retrained model to a plurality of environments such as production, testing, auxiliary environments and servers.

Figure 5:
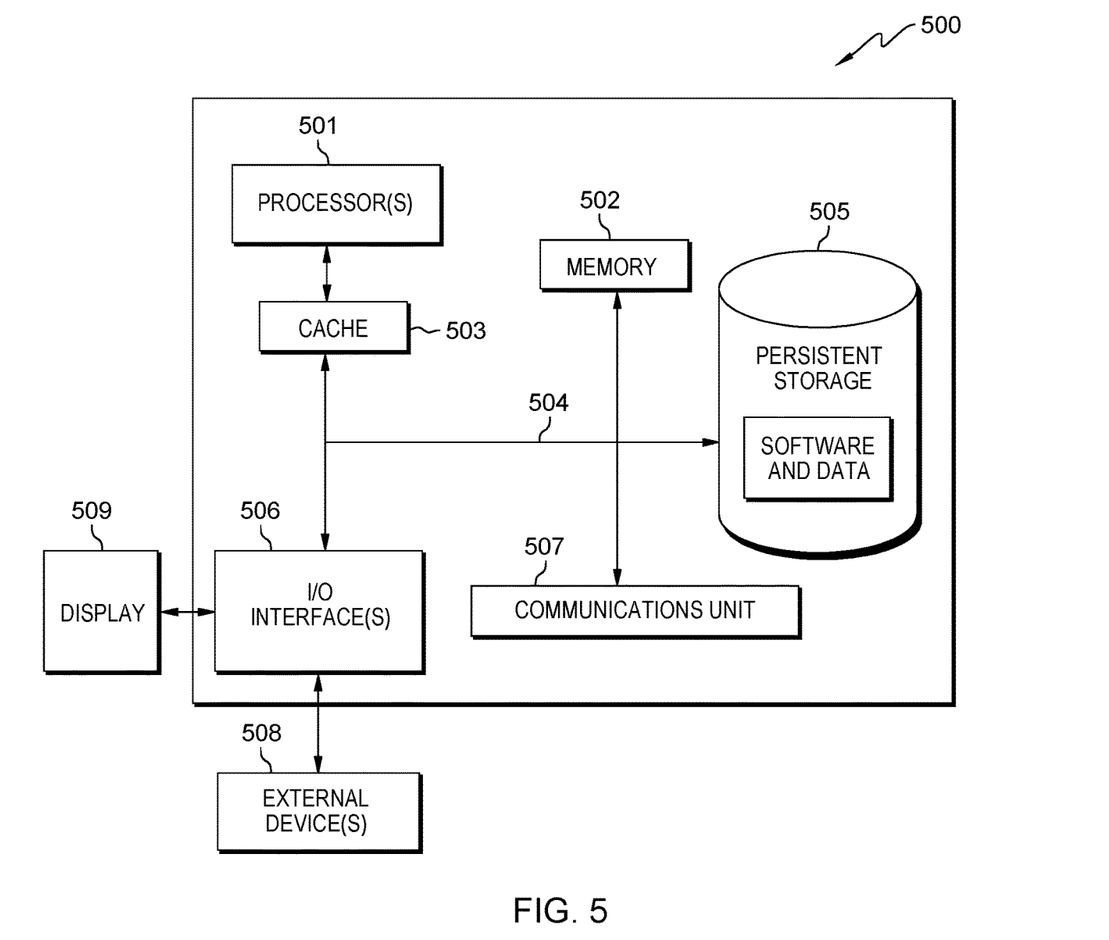
FIG. 5 is a block diagram of components of the server computer, in accordance with an embodiment of the present invention.

FIG. 5 depicts a block diagram of components of server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 120 each include communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of computer processor(s) 501 by holding recently accessed data, and data near accessed data, from memory 502.

Training program 150, scoring program 250, and incremental training program 350 each may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Training program 150, scoring program 250, and incremental training program 350 each may be downloaded to persistent storage 505 through communications unit 507.

I/O interface(s) 506 allows for input and output of data with other devices that may be connected to server computer 120. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., training program 150, scoring program 250, and incremental training program 350, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
creating, by one or more computer processors, a subset of a dataset utilizing a trained primary model, comprising:
generating, by one or more computer processors, a confidence value for each case in the dataset utilizing the primary model;
creating, by one or more computer processors, the subset with one or more minor pattern cases that fail to exceed a confidence threshold; and
expanding, by one or more computer processors, the subset with derived features;
creating, by one or more computer processors, a secondary model based on the created subset of the dataset;
adjusting, by one or more computer processors, the confidence threshold based on a delta value associated with the created subset of the dataset;
calculating, by one or more computer processors, a confidence of a new case utilizing the trained primary model, wherein the confidence is a robustness indicator of a model indicating a capacity of the model to meet or exceed performance when applied to the dataset;
responsive to the calculated confidence not exceeding a confidence threshold, generating, by one or more computer processors, a new confidence of the new case utilizing the created secondary model;
responsive to an incorrect classification, updating, by one or more computer processors, the created subset of the dataset with the case; and
retraining, by one or more computer processors, the secondary model utilizing the updated subset of the dataset.

2. The method of claim 1, wherein the confidence threshold is determined based on one or more historical case predictions and a set of derived features.

3. The method of claim 1, wherein the confidence threshold is calculated utilizing a cumulative probability distribution.

4. The method of claim 1, further comprising:
responsive to the incorrect classification by the primary model, labelling, by one or more computer processors, the case as a long-term training case; and updating, by one or more computer processors, the dataset with the long-term training case.

5. The method of claim 4, further comprising:
responsive to an accumulation of long-term training cases, retraining, by one or more computer processors, the primary model utilizing the updated dataset.

6. The method of claim 1, wherein the created subset of the dataset contains low confidence cases.

7. The method of claim 1, wherein the primary and secondary models are neural networks.

8. A computer program product comprising:
one or more computer readable storage media and program instructions stored on the one or more computer readable storage media, the stored program instructions comprising:
program instructions to create a subset of a dataset utilizing a trained primary model, comprising:
program instructions to generate a confidence value for each case in the dataset utilizing the primary model;
program instructions to create the subset with one or more minor pattern cases that fail to exceed a confidence threshold; and
program instructions to expand the subset with derived features;
program instructions to create a secondary model based on the created subset of the dataset;
program instructions to adjust the confidence threshold based on a delta value associated with the created subset of the dataset;
program instructions to calculate a confidence of a new case utilizing the trained primary model, wherein the confidence is a robustness indicator of a model indicating a capacity of the model to meet or exceed performance when applied to the dataset;
program instructions to, responsive to the calculated confidence not exceeding a confidence threshold, generate a new confidence of the new case utilizing the created secondary model;
program instructions to, responsive to an incorrect classification, update the created subset of the dataset with the case; and
program instructions to retrain the secondary model utilizing the updated subset of the dataset.

9. The computer program product of claim 8, wherein the confidence threshold is determined based on one or more historical case predictions and a set of derived features.

10. The computer program product of claim 8, wherein the confidence threshold is calculated utilizing a cumulative probability distribution.

11. The computer program product of claim 8, wherein the program instructions, stored on the one or more computer readable storage media, comprise:
program instructions to, responsive to the incorrect classification by the primary model, label the case as a long-term training case; and
program instructions to update the dataset with the long-term training case.

12. The computer program product of claim 11, further comprising:
program instructions to, responsive to an accumulation of long-term training cases, retrain the primary model utilizing the updated dataset.

13. The computer program product of claim 8, wherein the created subset of the dataset contains low confidence cases.

14. The computer program product of claim 8, wherein the primary and secondary models are neural networks.

15. A computer system comprising:
one or more computer processors;
one or more computer readable storage media; and
program instructions stored on the computer readable storage media for execution by at least one of the one or more processors, the stored program instructions comprising:
program instructions to create a subset of a dataset utilizing a trained primary model, comprising:
program instructions to generate a confidence value for each case in the dataset utilizing the primary model;
program instructions to create the subset with one or more minor pattern cases that fail to exceed a confidence threshold; and
program instructions to expand the subset with derived features;
program instructions to create a secondary model based on the created subset of the dataset;
program instructions to adjust the confidence threshold based on a delta value associated with the created subset of the dataset;
program instructions to calculate a confidence of a new case utilizing the trained primary model, wherein the confidence is a robustness indicator of a model indicating a capacity of the model to meet or exceed performance when applied to the dataset;
program instructions to, responsive to the calculated confidence not exceeding a confidence threshold, generate a new confidence of the new case utilizing the created secondary model;
program instructions to, responsive to an incorrect classification, update the created subset of the dataset with the case; and
program instructions to retrain the secondary model utilizing the updated subset of the dataset.

16. The computer system of claim 15, wherein the confidence threshold is determined based on one or more historical case predictions and a set of derived features.

17. The computer system of claim 15, wherein the confidence threshold is calculated utilizing a cumulative probability distribution.

18. The computer system of claim 15, wherein the program instructions, stored on the one or more computer readable storage media, comprise:
program instructions to, responsive to the incorrect classification by the primary model, label the case as a long-term training case; and
program instructions to update the dataset with the long-term training case.

19. The computer system of claim 18, further comprising:
program instructions to, responsive to an accumulation of long-term training cases, retrain the primary model utilizing the updated dataset.

20. The computer system of claim 15, wherein the created subset of the dataset contains low confidence cases.

* * * * *